Patented Feb. 13, 1951

2,541,825

UNITED STATES PATENT OFFICE 2,541,825

COATING COMPOSITIONS CONTAINING GLYOXALIDINE COMPOUNDS

Hans S. Mannheimer, New York, N. Y., assignor to McCabe Paint and Varnish Co., Irvington, N. J., a corporation of New Jersey No Drawing. Application May 20, 1947, Serial No. 749,361

4 Claims. (Cl. 106—253)

This invention relates to novel compositions of matter and more particularly to novel coating compositions. In one of its specific aspects the invention is directed to novel and improved compositions of matter finding particular application as coating compositions for the weatherproofing, waterproofing and preservation of wooden surfaces.

The class of coating compositions with which this invention is particularly concerned are those coating compositions containing as an essential ingredient a liquid material which when in film form dries on exposure to air. Examples of some of said liquid materials are linseed oil, Chinawood oil, oiticica oil, etc. as well as various synthetic resinous compositions, the most common of which used for that purpose are the well known alkyd resins and especially those which are oil modified. These various materials, if desired are bodied to the desired degree by either heating or blowing. These coating compositions may also include a pigmenting material, examples of which are titanium oxide, lithopone, chrome yellow, Prussian blue, etc., a solvent for the film forming constituent, such as turpentine, mineral spirits or the like, and a drier such as lead, manganese, or cobalt resinate or naphthanate or the like. These various coating compositions have been sold and used as paints, stains, varnishes, enamels, etc.

In the course of my experimentations with said class of coating compositions, I have discovered that they may be considerably improved by combining therewith a glyoxalidine compound having at least two of the following groups

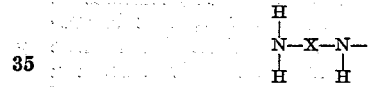

in which X is an organic group containing within 1 to 6 carbon atoms in straight chain relationship with said primary and secondary amine groups, A is a hydrocarbon radicle of a monocarboxylic organic acid and contains at least 6 carbon atoms in straight chain relationship, and the sum of the maximum number of carbon atoms in a straight chain relationship in A and the number of carbon atoms in X in straight chain relationship with the primary and secondary groups being at least 10. In general, the quantity of one or more of said glyoxalidine compounds in said coating compositions may be small and ordinarily is between 0.5 to 5% by weight. The presence of one or more of said glyoxalidines in said coating compositions reduces the surface tension thereof and permits greater penetration of the coating composition into the pores and cells of the object to be coated. This is particularly evident when the object to be coated is of cellulosic composition. In addition due to the electrical charge of these glyoxalidine compounds, which are cation active, they are attracted to the object to be coated, and when the object to be coated is a cellulosic composition, such as wood, the molecules of the glyoxalidine compounds present in the coating composition besides penetrating into the pores or cells thereof, react therewith to form stable compounds tenaciously coupled to the surface of the wood. As a consequence, the presence of one or more of said glyoxalidines in said coating compositions, impart greater durability to films thereof particularly when applied to cellulosic surfaces. These surface coatings oxidize more slowly and adhere much longer to the surface to be coated than do corresponding coating compositions without one of said glyoxalidine compounds.

The glyoxalidines which are employed in this invention may be produced in the manner set forth in my copending United States patent application 548,801, filed Aug. 9, 1944, and now abandoned made part hereof and of which this application is a continuation in part. As set forth therein, these glyoxalidines may be produced by reacting a polyamine with an organic acid. The polyamines which may be employed are those which contain at least 2 of the following groups $$\begin{array}{c} H \\ | \\ N-X-N- \\ | \quad | \\ H \quad H \end{array}$$

and having the following general formula $$\begin{array}{ccccc} H & & & & H \\ | & & & & | \\ N-X-N-Y-N-X-N \\ | & | & | & | \\ H & H & H & H \end{array}$$

in which X is an aliphatic and/or an aromatic group containing within 1 to 6 and preferably within 2 to 4 carbon atoms in straight chain relationship with the primary and secondary nitrogens in said structurally illustrated group and Y is any organic group. The polyamines are preferably free from any reactive ionic group whose reactivity to the group to which the amine is to be linked is greater than either the primary or secondary amine group on the above structurally illustrated group.

The following specific polyamines which may be employed in the practice of this invention and are set forth herein merely for the purposes of illustration and not in a limiting sense are: tetraethylene pentamine; hexamine tetraethylene mono phenylene; hexamine triethylene diethyleneoxide ether; hexamine triethylene dipropyleneoxide; hexamine triethylene diethylenemercaptan; hexamine triethylene dipropylenemercaptan; tetramine tri phenylene; pentamine tetraisobutylene; tetramine mono-isobutylene diethylene. These polyamines illustrate some of the different groups which may be employed as X and Y and respectively have the following chemical formulae:

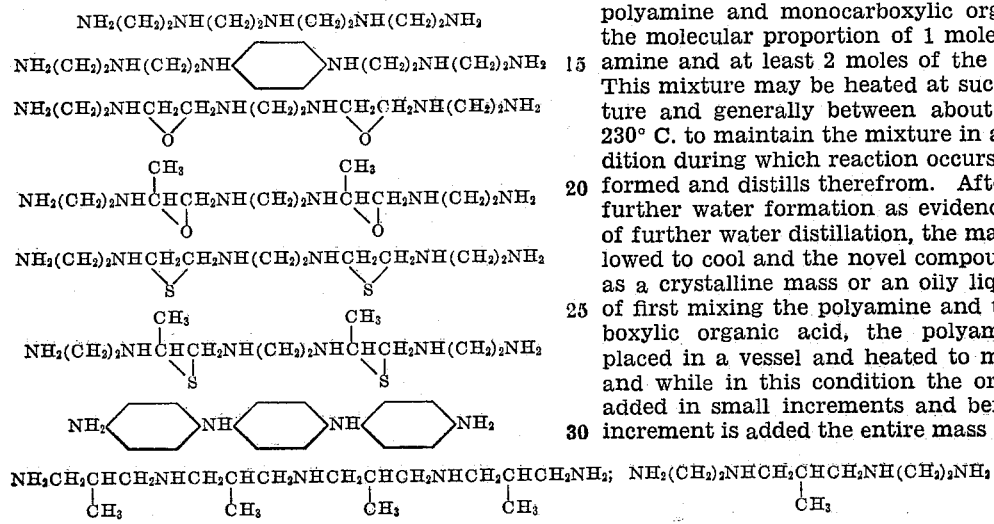

In practice there may be employed any of the organic acids containing a single COOH group or any of the available anhydrides of said acids and by the term monocarboxylic organic acid as used herein, I mean to include both the acid and the anhydride thereof which I regard as the equivalent of the acid. These acids may be: the aliphatic open chain saturated or unsaturated fatty acids as well as said fatty acids containing hydroxy or keto groups and/or other substitutes, such as aryl radicles, as for example, acids of the type of Twitchell fatty acids; cycloaliphatic carboxylic acids preferably containing no more than 4 condensed nuclei and examples of which are hexahydrobenzoic, resinic, and naphthenic acids; heterocyclic aliphatic carboxylic acids, such as the various pyridine carboxylic acids.

While carboxylic acids having any number of carbon atoms may be employed, I prefer to employ those having at least 10 carbon atoms. The acids which I employ may be derived from a number of different sources. Among some of them are the acid components chosen from oil or fats of animal, marine or vegetable origin and these include; the acids of cocoanut, palm kernel and palm oil which contain fatty acids having at least 10 carbon atoms and also from soy bean, linseed, olive, rapeseed, cottonseed, peanut and castor oil which contain large proportions of unsaturated hydroxy fatty acids and also the acids derived from tallow, fish and seal oils, whale or shark oils and the hydrogenated acids from these sources. Moreover, the synthetic high molecular weight fatty acids, obtained by the oxidation of paraffin wax and similar high molecular weight hydrocarbons by means of gaseous oxidizing agents may be employed. In addition the acid may be one of the resinic acids, such as abietic acid, or the naphthenic acids and long chain fatty acids having an aromatic hydrocarbon radicle connected directly with the aliphatic chain (Twitchell fatty acids) as are obtainable from oleic, ricinoleic, linoleic and similar unsaturated fatty acids. Instead of employing mixture of acids from oil, fats and resins, single acids may be used, for example caproic, pimelic, heptylic, caprylic, sebacic, undecylic, lauric, palmitic, stearic, behenic, arachic, cerotic, oleic, eruca, linoleic, linolenic, ricinoleic and hydroxystearic acids.

In carrying out the reaction there is placed in a reacting chamber a mixture of the desired polyamine and monocarboxylic organic acid in the molecular proportion of 1 mole of the polyamine and at least 2 moles of the organic acid. This mixture may be heated at such a temperature and generally between about 110° C. and 230° C. to maintain the mixture in a melted condition during which reaction occurs and water is formed and distills therefrom. After there is no further water formation as evidenced by a lack of further water distillation, the mass is then allowed to cool and the novel compound is present as a crystalline mass or an oily liquid. Instead of first mixing the polyamine and the monocarboxylic organic acid, the polyamine may be placed in a vessel and heated to melt the same and while in this condition the organic acid is added in small increments and before the next increment is added the entire mass is melted. In order to hasten the reaction and to obtain higher yields of the novel compounds which I produce by these methods, I prefer to employ a condensing agent with the polyamine and the monocarboxylic organic acid in the proportions heretofore stated. These agents are preferably acidic condensing agents and may include hydrochloric acid, sulphuric acid, phosphoric acid, phosphorus pentoxide, phosphorus pentachloride, etc. The quantity of acid condensing agent present in the mixture is preferably between 0.1% to .25% based on the total weight of the mixture. Also present in said mixture may be a tertiary organic base which is inert to the other components therein and is employed to prevent any appreciable reaction which might otherwise take place between the end product desired and the acid condensing agent. The amount of this base present may be approximately the same as the acidic condensing agent although this base may be entirely omitted. Among some of these bases are alkylamine, pyridine and dimethylaniline.

By reacting one of said polyamines and monocarboxylic organic acid in the molecular proportions of at least 2 of the latter to 1 of the former, I obtain compounds having at least two of the following groups:

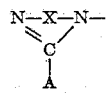

and which compounds may be represented by the following general formula:

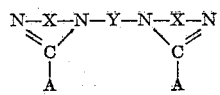

with X and Y being heretofore described and A being the radical originally connected to the monocarboxyl group of an acid and contains at least six carbon atoms in straight chain relationship, and the sum of the number of carbon atoms in straight chain relationship in A and the number of carbon atoms in X in straight chain relationship with the primary and secondary amine groups being equal to at least 10. Thus the polyamine must be particularly chosen as must be the monocarboxylic acid employed therewith to produce said compounds. These novel compounds above defined are either oily liquids or solids of a crystalline nature depending on the molecular weight of the organic acid employed. When the high molecular weight organic acids are employed the reaction products are solid and when the lower molecular weight organic acids are employed, the reaction products are oily liquids at room temperature. The more effective reaction products are those which are solids and therefore I prefer to employ those organic acids having a molecular weight above about 200.

For maximum yields the mixture of the polyamine, monocarboxylic organic acid and the acidic condensing agent is heated at temperatures necessary to fuse or melt the mixture and generally between 110° C. and 240° C. The mass is maintained in this melted condition whereupon the reaction takes place and the hydrogen of the primary and secondary amines groups unite with the OOH of the carboxyl group to form water which distills off. The reaction is complete when the number of moles of water which distills off is at least approximately four times the number of moles of organic acid originally present in the mixture. These compounds produced in the manner heretofore set forth are substantially water insoluble but are soluble in an acidic water solution whose pH is below 6.8.

The following Examples 1–8 are given merely further to illustrate the methods for producing said glyoxalidines.

*Example 1*

2 moles of monocarboxylic organic acid and 1 mole of polyamine
567 parts stearic acid
290 parts tetramine triphenylene
0.85 part concentrated sulphuric acid.

This mixture was heated to 140° C. and maintained at this temperature for about four hours during which time about 72 parts of water had been distilled off. The resultant reaction product has a molecular weight of 532 and was a water insoluble crystalline solid. This product is hereinafter termed B and has the following formula:

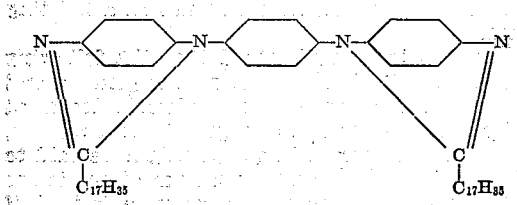

*Example 2*

4 moles of monocarboxylic organic acid and 1 mole of polyamine
1136 parts stearic acid
264 parts hexamine triethylene diethylene oxide ether (obtainable from ethylene diamine and ethylene oxide)
1 part phosphorus pentoxide
1 part pyridine This mixture was heated to about 160° C. and maintained at this temperature for about 12 hours during which time about 108 parts of water had distilled off. At the end of this period, there is substantially no free fatty acid present in the resultant mass and the molecular weight of the novel compound there is about 1292. This novel compound thus obtained is a water insoluble crystalline solid hereinafter termed product D and has the following formula:

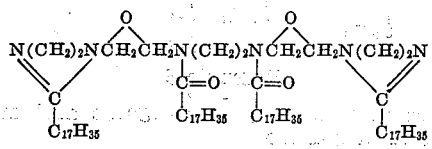

*Example 3*

3 moles of monocarboxylic organic acid and 1 mole of polyamine
852 parts stearic acid
307 parts heptamine tetraethylene diethylene oxide ether (obtainable from ethylene diamine, triethylene tetramine and ethylene oxide in the ratio of 2:1:2)
1 part phosphorus pentachloride
1.4 parts dimethylaniline The above mixture is heated to a temperature between 160° C. to 175° C. and maintained in said temperature range for about 12 to 14 hours during which time about 108 parts of water has been distilled off. The resultant reaction product has a molecular weight of about 1051 and is a water insoluble crystalline solid. This product hereinafter known as product E, has the following formula:

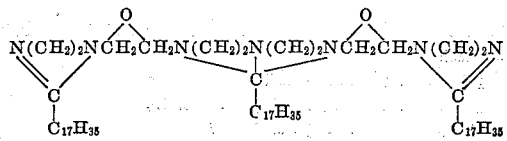

*Example 4*

2 moles of monocarboxylic organic acid and 1 mole of polyamine
568 parts of stearic acid
189 parts tetraethylene pentamine
1 part of phosphorus pentoxide
1.2 parts pyridine This mixture was heated to 140° C. and maintained at this temperature for about 4–6 hours during which time about 72 parts of water had been distilled off. The resultant reaction product had a molecular weight of about 685 and was a water insoluble crystalline solid. This product is hereinafter termed product F and has the following formula:

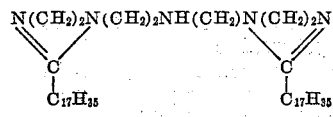

*Example 5*

4 moles of monocarboxylic organic acid and 1 mole of polyamine
1024 parts of palmitic acid
324 parts of hexamine triethylene dipropylene mercaptan
1 part of phosphorus pentoxide
1.3 parts of pyridine This mixture was heated to 190° C. and maintained at this temperature for about 6–12 hours during which time about 108 parts of water had been distilled off. The resultant reaction product had a molecular weight of about 1240 and was a water insoluble crystalline solid. This product is hereinafter termed product G and has the following formula:

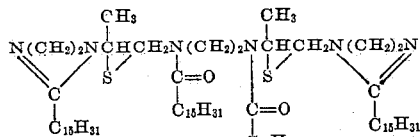

Example 6

2 moles of monocarboxylic organic acid and 1 mole of polyamine
565 parts of oleic acid
324 parts of hexamine triethylene dipropylene mercaptan
1 part phosphorus pentoxide
1.3 parts pyridine This mixture was heated to 140° C. and maintained at this temperature for about 4-8 hours during which time about 72 parts of water had been distilled off. The resultant reaction product had a molecular weight of about 817 and was a water insoluble crystalline solid. This product is hereinafter termed product K and has the following formula:

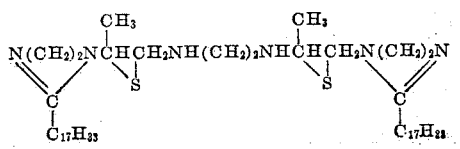

Example 7

2 moles of carboxylic acid and one mole of polyamine
605 parts of abietic acid
189 parts tetraethylene pentamine
1 part phosphorus pentoxide
1.3 parts pyridine This mixture was heated to 140° C. and maintained at this temperature for about 4-6 hours during which time about 72 parts of water had been distilled off. The resultant reaction product had a molecular weight of about 722 and was a water insoluble crystalline solid. This product is hereinafter termed product M and has the following formula:

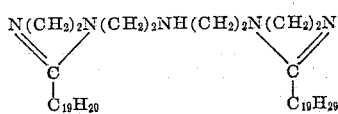

Example 8

2 moles of monocarboxylic organic acid and 1 mole of polyamine
445 parts anthracene carboxylic acid
189 parts tetraethylene pentamine
1 part phosphorus pentoxide
1.3 parts pyridine This mixture was heated to 160° C. and maintained at this temperature for about 4-6 hours during which time about 72 parts of water had been distilled off. The resultant reaction product had a molecular weight of about 562 and was a water insoluble crystalline solid. This product is hereinafter termed product N and has the following formula:

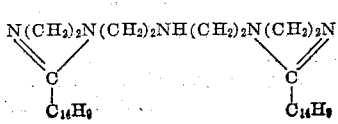

The following Examples I-III are given merely to illustrate a number of specific coating compositions embodying this invention with all parts being given by weight and said compositions being examples of improved stains for wooden roofing or siding shingles.

Example I 16 parts burnt umber
1 part carbon black
3 parts raw umber
16 parts linseed oil
16 parts mineral oil
4 parts drier
2 parts product B, D, E, F, G, K, M or N
42 parts petroleum solvents

Example II 22 parts chromium oxide
5 parts magnesium silicate
15 parts linseed oil
7 parts mineral oil
4 parts processed castor oil
4 parts alkyd resin
7 parts drier
2 parts product B, D, E, F, G, K, M or N
34 parts petroleum solvents

Example III 18 parts iron oxide
6 parts magnesium silicate
19 parts linseed oil
7.5 parts mineral oil
4 parts processed castor oil
7.5 parts drier
1 part product B, D, E, F, G, K, M or N
37 parts petroleum solvents These various products B, D, E, F, G, K, M and N are cationic surface active materials capable of reacting with cellulosic material present in wood fibers and have molecular weights of at least 500. The presence of one or more of said compounds in the various coating compositions greatly improves said compositions when employed as a film coating on wooden or other cellulosic surfaces as herein before stated.

Since certain changes may be made in the above compositions of matter and different embodiments of the invention could be made without departing from its scope, it is intended that all matter contained in the above description shall be interpreted as illustrative and not in a limiting sense.

It is also to be understood that the following claims are intended to cover all the generic, and specific features of the invention herein described and all statements of the scope of the invention, which as a matter of language might be said to fall therebetween; and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

I claim:

1. A coating composition capable of drying on exposure to air to provide a weatherproof coating and comprising the combination with a normally liquid material which when in film form dries on exposure to air, a pigment, a drier and a solvent for said normally liquid material; of a glyoxalidine compound having at least two of the following groups

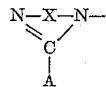

in which X is an organic group containing within 1 to 6 carbon atoms in straight chain relationship with said primary and secondary amine groups, A is a hydrocarbon radicle of a monocarboxylic organic acid and contains at least 6 carbon atoms in straight chain relationship, and the sum of the maximum number of carbon atoms in a straight chain relationship in A and the number of carbon atoms in X in straight chain relationship with the primary and secondary groups being at least 10, the percentage of said compound in said composition being in the range of 0.5 to 5 by weight said compound produced by reacting two moles of a monocarboxylic organic acid containing at least six carbon atoms in straight chain relationship with a polyamine selected from the group consisting of tetraethylene pentamine; hexamine tetraethylene mono phenylene; hexamine triethylene diethyleneoxide ether; hexamine triethylene dipropyleneoxide; hexamine triethylene diethylenemercaptan; hexamine triethylene dipropylenemercaptan; tetramine triphenylene; pentamine tetraisobutylene; tetramine mono-isobutylene diethylene.

2. A coating composition capable of drying on exposure to air to provide a weatherproof coating and comprising the combination with a normally liquid material which when in film form dries on exposure to air, a pigment, a drier and a solvent for said normally liquid material; of a glyoxalidine compound containing at least two of the following groups

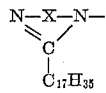

in which X is an organic group containing within 1 to 6 carbon atoms in straight chain relationship with said primary and secondary amine groups, the percentage of said compound in said composition being in the range of 0.5 to 5 by weight said compound produced by reacting two moles of stearic acid with a polyamine selected from the group consisting of tetraethylene pentamine; hexamine tetraethylene mono phenylene; hexamine triethylene diethyleneoxide ether; hexamine triethylene dipropyleneoxide; hexamine triethylene diethylenemercaptan; hexamine triethylene dipropylenemercaptan; tetramine triphenylene; pentamine tetraisobutylene; tetramine monoisobutylene diethylene.

3. A coating composition capable of drying on exposure to air to provide a weatherproof coating and comprising the combination with a normally liquid material which when in film form dries on exposure to air, a pigment, a drier and a solvent for said normally liquid material; of a glyoxalidine compound having the following general formula:

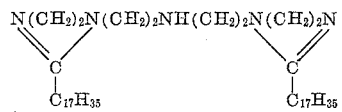

the percentage of said compound in said composition being in the range of 0.5 to 5 by weight.

4. A coating composition capable of drying on exposure to air to provide a weatherproof coating and comprising the combination with a normally liquid material which when in film form dries on exposure to air, and a solvent for said normally liquid material; of a glyoxalidine compound having at least two of the following groups

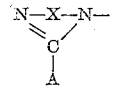

in which X is an organic group containing within 1 to 6 carbon atoms in straight chain relationship with said primary and secondary amine groups, A is a hydrocarbon radicle of a monocarboxylic organic acid and contains at least 6 carbon atoms in straight chain relationship, and the sum of the maximum number of carbon atoms in a straight chain relationship in A and the number of carbon atoms in X in straight chain relationship with the primary and secondary groups being at least 10, the percentage of said compound in said composition being in the range of 0.5 to 5 by weight said compound produced by reacting two moles of a monocarboxylic organic acid containing at least six carbon atoms in straight chain relationship with a polyamine selected from the group consisting of tetraethylene pentamine; hexamine tetraethylene mono phenylene; hexamine triethylene diethyleneoxide ether; hexamine triethylene dipropyleneoxide; hexamine triethylene diethylenemercaptan; hexamine triethylene dipropylenemercaptan; tetramine triphenylene; pentamine tetraisobutylene; tetramine mono-isobutylene diethylene.

HANS S. MANNHEIMER.

REFERENCES CITED

The following references are of record in the file of this patent:

UNITED STATES PATENTS

| Number | Name | Date |
|---|---|---|
| 2,268,273 | Wilkes et al. | Dec. 30, 1941 |
| 2,355,837 | Wilson | Aug. 15, 1944 |